W. A. NEWTON,
Post and Pile Driver.
No. 9,119. Reissued Mar. 16, 1880.
Fig. 3.
Fig. 1.
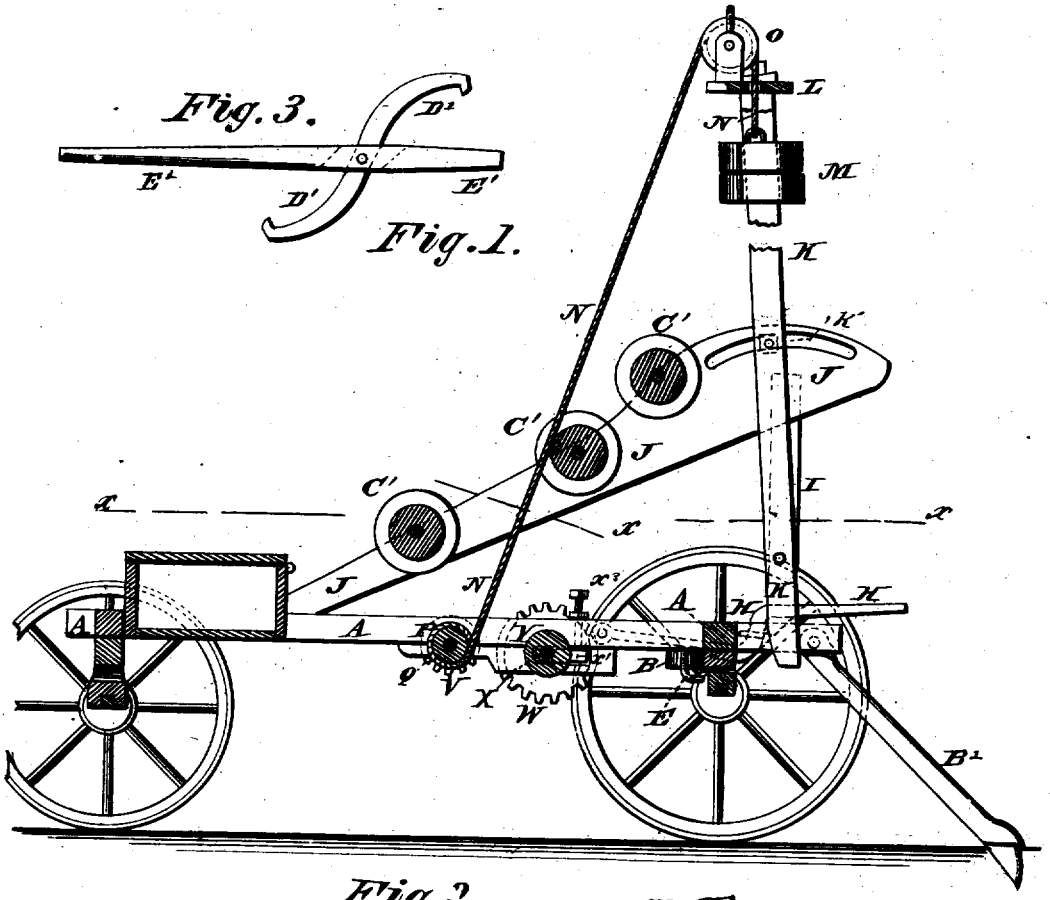
Fig. 2.
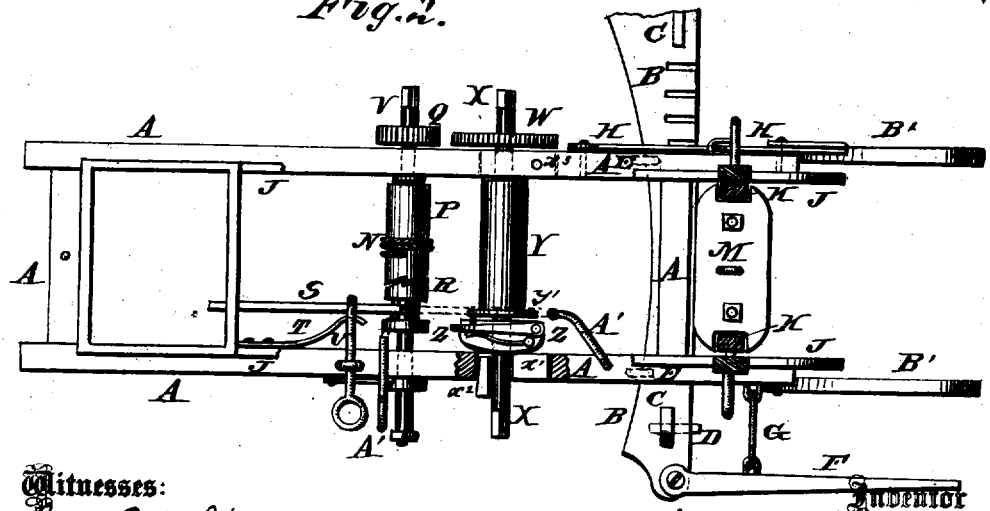
Witnesses:
A. W. Bright
F. A. McCleary.
Inventor
Wm A. Newton.
Per H. A. Seymour. Attorneys.
N. PETERS, PHOTO-LITHOGRAPHER, WASHINGTON, D. C.

UNITED STATES. PATENT OFFICE.

WILLIAM A. NEWTON, OF PAPPINVILLE, MISSOURI.

POST AND PILE DRIVER.

SPECIFICATION forming part of Reissued Letters Patent No. 9,119, dated March 16, 1880.

Original No. 188,066, dated March 6, 1877. Application for reissue filed August 1, 1879.

DIVISION A.

*To all whom it may concern:*

Be it known that I, WM. A. NEWTON, of Pappinville, in the county of Bates and State of Missouri, have invented a new and Improved Post and Pile Driver, of which the following is a specification.

My invention relates to a post and pile driver, and is especially adapted for use in building wire fences.

In the drawings, Figure 1 is a view, in side elevation, of my machine, partly in section, to show the construction. Fig. 2 is a plan view of the same, partly in section, through line *x x x* of the preceding figure. Fig. 3 is a side view of a device for holding and adjusting the post while being driven.

The base-frame A of the machine has its forward end resting on the forward bolster of an ordinary wagon, where it is secured in place by the king-bolt. The rear part of the frame A rests upon the false bolster B, which is secured to the rear axle of the wagon by the short stakes C and keys D. The frame A is kept from rising from the false bolster B by the hooks E, attached to the side bars of the said frame, and which underlap the said bolster. The forward edge of the false bolster B is concaved, to conform to the arc of a circle having its center at the king-bolt, so that the rear end of the frame A may be moved laterally, to properly adjust it to the post to be driven.

The frame A is adjusted by the lever F, the end of which is pivoted to the end of the false bolster B, and which is connected with the frame A by the hook-rod G. The frame A is secured in place, when adjusted, by the lever H, which is pivoted to the side bar of the frame A, and enters notches in the false bolster B. To the rear parts of the side bars of the frame A are attached two uprights, I, to the upper ends of which are securely attached the rear parts of the bars or plates J. The forward ends of the bars J are attached to the forward parts of the side bars of the frame A.

To the uprights I are pivoted the lower ends of the two standards K, the upper ends of which are connected by a cross-bar, L. The standards K are secured in place, when adjusted, by clamping-bolts $k'$, which pass through them and through curved slots in the upper rear parts of the inclined bars J.

This construction enables the standards K to be adjusted into a vertical position when the surface of the ground into which the posts are to be driven is inclined. The standards K also serve as ways for the hammer M, which may be made in parts securely bolted together, so that its weight may be increased or diminished as required.

To the top of the hammer M is attached the end of a rope, N, that passes through the cross-bar L, around the pulley O, attached to the upper side of said bar L, and down to the drum P, to which its other end is attached.

The drum P revolves loosely upon the shaft Q, the journals of which work in bearings attached to the side bars of a frame, A, and its ends are squared off to receive the cranks by means of which power is applied to it. The shaft Q is made to carry the drum P with it, in its revolution, by the clutch R, which slides upon the said shaft and engages with the end of the said drum.

S is a lever, one end of which is forked to fit in a groove in the clutch R, and its other end is connected with the frame A, or with a support attached to said frame. The clutch R is pressed against the end of the drum P by a spring, T, interposed between the lever S and the side bar of the frame A, and is withdrawn from said drum by a rod, U, attached to the lever S, and passing out through a guide-hole in the side bar of the frame A.

To one journal of the shaft Q is attached a gear-wheel, V, the teeth of which mesh into the teeth of the gear-wheel W, attached to a journal of the shaft X. The shaft X revolves in long or slotted bearings attached to the side bars of the frame A, and is adjusted to throw the wheel W into and out of gear with the wheel V by adjusting the blocks $x'$ upon one or the other side of said shaft, and securing them in place by wedge-keys $x^2$. The blocks $x'$ are further secured in place by the pins $x^3$, passed through them and through the side bars of the frame A.

Y is a drum which revolves loosely upon the shaft X, and to the end of which is attached a plate, $y'$, having a number of holes formed in it near its edge to receive the catch of the clutch Z. The clutch Z is formed by attaching a plate to the shaft X, and pivoting to said plate a catch held forward by a spring. The clutch Z is thrown out of gear with drum Y by a lever, A′, pivoted to the side bar of the frame A in such a position that it may be adjusted so that the spring-catch of the clutch Z will strike against it and be drawn outward.

When a heavy hammer, M, is to be used for pile-driving and other heavy work, the end of the rope N is detached from the drum P and attached to the drum Y.

In using the machine for driving posts or piles, it is driven up to the place where the post or pile is to be driven, and the hammer is raised and allowed to drop upon its upper end until it has been driven to a sufficient depth.

The post or pile is adjusted and steadied while being driven by the device shown in Fig. 3 of the drawings, which is formed by pivoting the S-shaped hooked bar D′ in the slot of a lever, E′.

Having fully described my invention, what I claim, and desire to secure by Letters Patent, is—

1. In a post and pile driver, the combination, with the lever pivoted to one end of the false bolster, of the link which connects said lever to the base-frame, substantially as set forth.

2. In a post and pile driver, the combination, with the false bolster, one of whose extremities has its upper surface transversely grooved, of the angular lever pivoted to the corresponding side bar of the base-frame, together with the lever pivoted to the opposite extremity of the bolster, and the link which connects the corresponding side bar of the base-frame to this latter lever, substantially as set forth.

3. In a post and pile driver, the combination, with the perforated annular plate fixed to the end of the loose drum on a rotary shaft, of the spring-catch secured to the latter, and the lever which withdraws said catch from engagement with the perforated plate, substantially as set forth.

4. In a post and pile driver, a hammer consisting in the combination, with two or more independent horizontal sections, of a fastening device which detachably connects said sections together, substantially as set forth.

5. In a post and pile driver, the combination, with the rotary shaft carrying the loose drum, whose end has a perforated annular plate secured thereto, and the plate fixed to the corresponding shaft end, of the catch, one of whose extremities is pivoted to the latter plate, and whose opposite extremity has an inwardly-projecting lug, together with the spring which presses said catch inwardly, and the lever which engages with the catch to force it outward, substantially as set forth.

6. In a post and pile driver, the combination of two drum-shafts having gear-engagement with each other, one of said shafts being journaled in slotted bearings, and adjustable therein by blocks and wedge-keys placed on opposite sides of its journals, substantially as set forth.

7. In a post and pile driver, the combination, with the drum-shaft whose extremity has a pinion secured thereto, of the drum-shaft whose corresponding extremity has a gear-wheel, said latter shaft being journaled in bearings slotted transversely to its length, and adjustable therein by blocks and keys placed, respectively, on opposite sides of its journals, substantially as set forth.

8. In a post and pile driver, the combination, with a drum-shaft adapted to gear with a second drum-shaft and slotted bearings in which it is journaled, of the blocks and wedge-keys, which are placed, respectively, on opposite sides of its journals, together with pins which secure said blocks in position by passing through holes formed therein and in the side bars of the base-frame, substantially as set forth.

9. In a post and pile driver, a hammer consisting in the combination, with two or more horizontal sections, of bolts which pass transversely through and secure said sections together, substantially as set forth.

10. In apparatus for driving posts and piles, the combination, with a hammer and uprights, between which it has vertical sliding movement, of the hand-lever having a slotted extremity, and the S-shaped hooked bar pivoted in said slot, substantially as set forth.

11. In a post and pile driver, the combination, with the horizontally-inclined bars whose lower extremities are secured to the forward portion of the base-frame, while their upper extremities are secured to the rear uprights and are formed with segmental slots, of the standards whose lower ends are pivoted to said uprights, and clamping-bolts which work in said slots to secure the standards thereto in desired adjustment, substantially as set forth.

WILLIAM A. NEWTON.

Witnesses:
SAMUEL CASS,
JNO. HARTMAN.